Nov. 5, 1935.　　　　E. GUTJAHR　　　　2,020,258

DYNAMO ELECTRIC MACHINE

Filed Aug. 4, 1934

Inventor
Emil Gutjahr
by Stenzel McKay
his attorneys

Patented Nov. 5, 1935

2,020,258

UNITED STATES PATENT OFFICE 2,020,258

DYNAMO-ELECTRIC MACHINE

Emil Gutjahr, Wendlingen O/A Esslingen, Germany, assignor to Robert Bosch Aktiengesellschaft, Stuttgart, Germany Application August 4, 1934, Serial No. 738,556
In Germany September 9, 1933

8 Claims. (Cl. 171—252)

The present invention relates to improvements in dynamo-electric machines of the type having a fixed armature and magnet system and a rotary flux conductor piece.

The object of this invention is to provide a cheap construction suitable for robust work.

According to the present invention the armature system is mounted on the cover of the machine and serves as a supporting means and also simultaneously as a means of connecting the cover and the machine casing.

The invention is more particularly described with reference to the form of construction shown in the accompanying drawing in which:—

Figure 1:
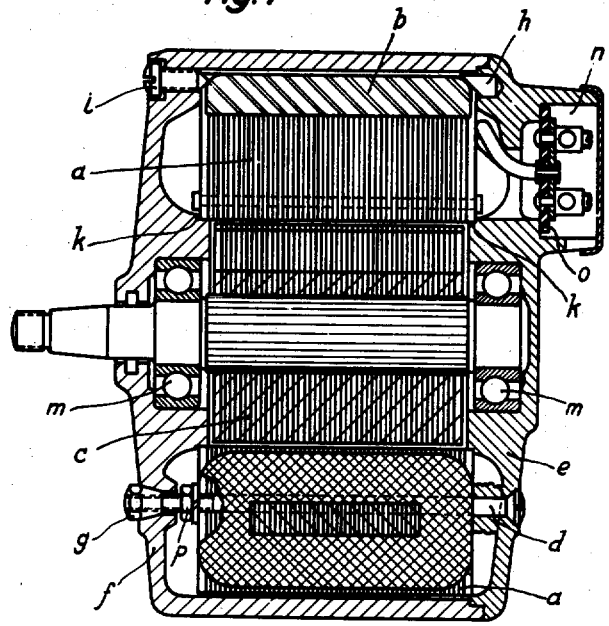
Figure 1 is an electric current-producing device in sectional elevation.
Figure 2:
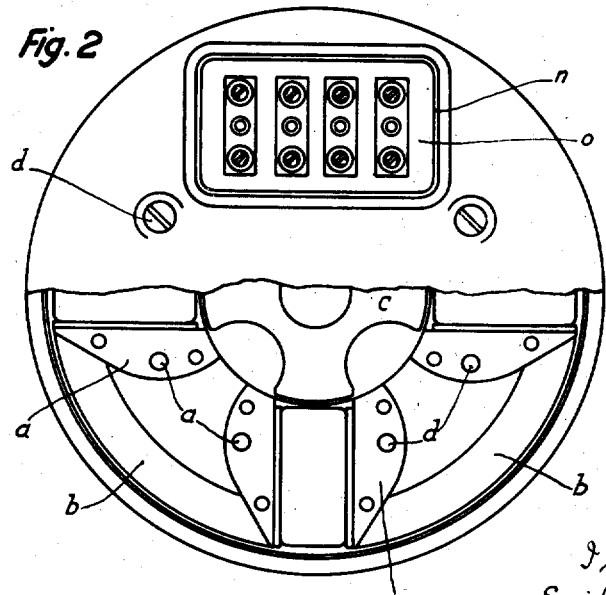
Figure 2 is a corresponding plan view.

The dynamo-electric machine consists of a number of armature cores $a$ of H-shape, which are provided with windings and are equally spaced from one another, around a circle; it also includes bar magnets $b$ which lie between the armature cores and a flux conducting piece $c$ which rotates within the armature cores. The armature cores are connected with the cover $e$ by means of threaded bolts $d$ and nuts $p$.

The bolts project beyond the armature cores and pass through the side of a pot-shaped casing $f$ which enclose the armature cores and the magnets. Nuts $g$ on the bolt ends secure the casing and the cover-plate together. In order to secure the bar magnets firmly upon the armature cores, inclined surfaces $h$ are provided on the cover-plate against which the outer edges of the magnets abut. Screws $i$ are secured in the casing $f$ which by these magnets are forced against the inclined surfaces and consequently pressed inwardly against the armature cores. The armature cores lie at both ends on circular surfaces $k$ of the casing and cover-plate and are consequently thereby accurately centered so that the air gap between the cores and the flux conducting piece remains small. The flux conducting piece is mounted in bearings $m$ in the cover-plate and in the casing. The cover-plate has also a recess $n$ in which a distributor board $o$ for connection of conductors to the winding ends is mounted.

I declare that what I claim is:

1. A dynamo-electric machine comprising in combination a fixed armature system, a fixed magnet system, a rotary flux path piece co-operating therewith, a casing enclosing said armature system, a cover-plate supporting said armature system, and common means for securing said casing to said cover-plate and for securing said armature system upon said cover-plate.

2. A magneto for dynamo-electric machines, comprising a fixed armature system, a fixed magnet system having inclined ends, a rotary flux path conductor piece, a cover-plate, inclined surfaces on said cover-plate against which the outer edges of said magnets abut, a casing enclosing said armature system and magnet system, common means for securing said casing and said armature system to said cover-plate, and means to force said magnet system against the inclined surfaces of said cover-plate.

3. A dynamo-electric machine comprising in combination a plurality of armatures disposed about a circle, a plurality of windings thereon, a plurality of magnets associated therewith, a rotary flux-conducting piece, a cover-plate, a casing enclosing said armatures, windings, magnets and said conductor piece and common means for securing said casing to said cover-plate and for securing said armatures to said cover-plate.

4. A dynamo-electric machine, comprising in combination a plurality of armatures disposed about a circle, a plurality of magnets co-operating therewith, a rotary flux conductor piece, a cover-plate, a pot-shaped casing, common means for securing said pot-shaped casing to said cover-plate, and for securing said armatures to said cover-plate.

5. A dynamo-electric machine, comprising in combination a plurality of armatures disposed about a circle, a plurality of magnets co-operating therewith, a rotary flux conductor piece, a cover-plate, a pot-shaped casing, common means for securing said pot-shaped casing to said cover-plate, and for securing said armatures to said cover-plate, and means carried by said casing and said cover-plate for centering said armatures relatively to said rotary flux conductor piece.

6. A dynamo-electric machine comprising in combination a cover-plate, bolts mounted thereon, armatures having coil windings supported by said bolts, magnets associated with said windings, an enclosing casing for said windings, nuts on said bolts securing said windings thereto, and a second set of nuts on said bolts for securing said casing to said cover-plate.

7. A dynamo-electric machine comprising in combination a cover-plate, bolts mounted thereon, armatures having coil windings supported by said bolts, magnets associated with said windings, an enclosing casing for said windings, nuts on said bolts securing said windings thereto, and a second set of nuts on said bolts for securing said casing to said cover-plate.

8. A dynamo-electric machine comprising in combination a fixed armature system, a fixed magnet system, a rotary flux conductor piece cooperating therewith, a casing enclosing said armature system and having a cover plate, common means for securing said casing to said cover plate and for securing said armature system upon said cover plate, and means carried by said casing cooperating with means carried by said cover-plate to secure said magnet system in engagement with said armature system.

EMIL GUTJAHR.